AMPLITUDE LIMITING ARRANGEMENTS FOR ELECTRIC
CARRIER CURRENT COMMUNICATION SYSTEMS
Filed July 11, 1952

Inventor
J. S. M. MACMULLAN –
A. MORTLOCK
By Philip M. Bolton
Attorney

United States Patent Office 2,706,776

Patented Apr. 19, 1955

2,706,776

AMPLITUDE LIMITING ARRANGEMENTS FOR ELECTRIC CARRIER CURRENT COMMUNICATION SYSTEMS

John Sumner Munro MacMullan and Alfred Mortlock, London, England, assignors to International Standard Electric Corporation, New York, N. Y., a corporation of Delaware Application July 11, 1952, Serial No. 298,372

Claims priority, application Great Britain July 24, 1951

4 Claims. (Cl. 250—20)

The present invention relates to amplitude limiting and noise suppression arrangements for electric carrier current communication systems.

In radio communication systems in which both sidebands and the carrier wave are transmitted to the receiver, it is usually necessary to regenerate the received carrier wave and as far as possible to remove noise therefrom. When a radio system is subject to serious fading, the signal-to-noise ratio may at times reach very low values, and while the operation of the automatic gain control arrangements maintains the carrier level substantially constant, it effectively increases the noise voltages when the signal-to-noise ratio is low, so that they may become comparable with the signal voltage.

However, generally the automatic gain control system has a rather long time constant and it will not follow a rapid variation in signal level. For this reason limiting arrangements are necessary in order that a regenerated carrier wave of constant amplitude may be available at the receiver.

It is also necessary to eliminate the noise from the regenerated carrier wave, and it is found that efficient elimination of the noise produced when serious fading occurs is incompatible with efficient limiting when the signal-to-noise ratio is good.

The principal object of the invention therefore, is to reconcile as far as possible these conflicting requirements.

This object is achieved according to the invention by providing an amplitude limiting and noise suppressing arrangement for an electric carrier current communication receiver provided with automatic gain control arrangements, comprising a limiting amplifier valve to which are applied the received waves after subjection to automatic gain control, means including a normally blocked control valve for applying a cut-off bias voltage to the limiting valve, and means for applying the automatic gain control voltage to the control valve in such manner that when the signal-to-noise ratio of the received waves becomes less than a predetermined value the control valve is unblocked, the arrangement being such that when the control valve is unblocked, the said cut-off bias voltage is increased.

Figure 1:
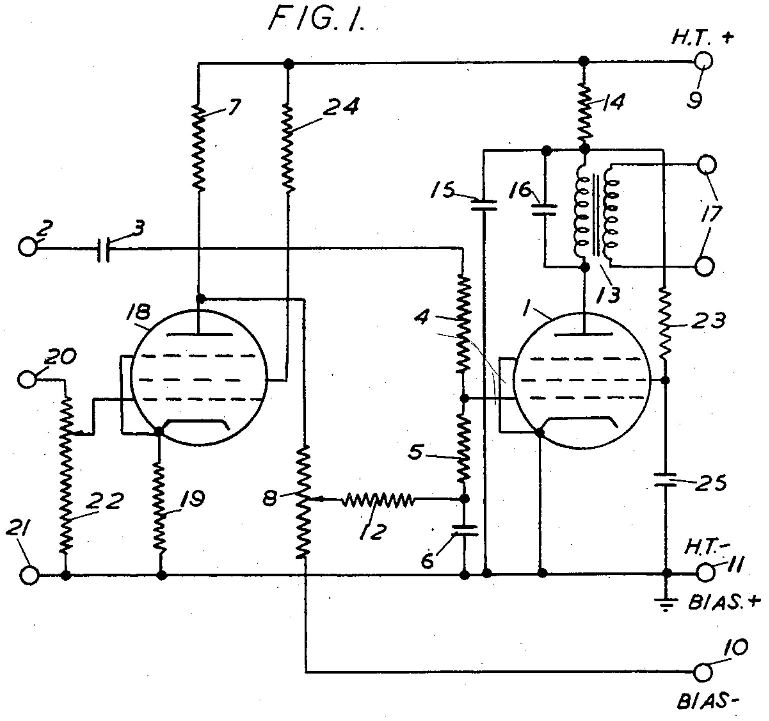
Figure 2:
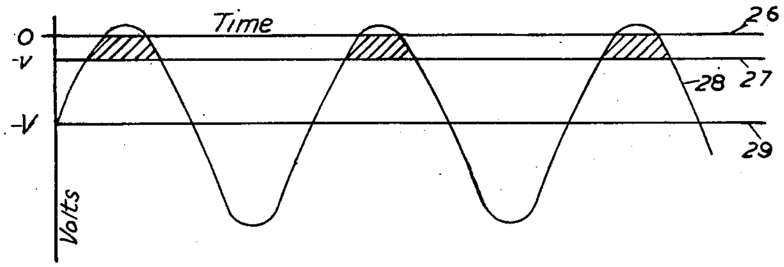

Fig. 1 of the accompanying drawing shows a block schematic circuit diagram of an embodiment of the invention intended to convert the received carrier wave into a wave of constant amplitude, and with the accompanying noise removed. Fig. 2 shows a graphical diagram used to explain the operation of Fig. 1.

The circuit shown in Fig. 1 comprises a limiting valve 1 which should preferably be a pentode as shown. The received carrier wave is applied to terminal 2 after it has been subjected to the usual automatic gain control process in earlier stages of the process in earlier stages of the receiver (not shown). Terminal 2 is connected through a blocking capacitor 3 to a potential divider comprising two resistors 4 and 5 connected in series. Resistor 5 is connected to ground through a blocking capacitor 6. The control grid of the valve 1 is connected to the junction point of resistors 4 and 5.

The cathode of the valve 1 is connected to ground, and negative grid bias is obtained from a chain of resistors including a resistor 7 and a potentiometer 8 connected in series between the positive high tension terminal 9 and a terminal 10 for a negative bias source (not shown).

The grounded terminal 11 is used as the negative terminal for the high tension source and as the positive terminal for the bias source. The movable contact of the potentiometer 8 is connected through a resistor 12 of high resistance to the junction point of elements 5 and 6. Additional resistors (not shown) may be connected in series with the potentiometer 8, if necessary.

The anode of the valve 1 is connected to terminal 9 through the primary winding of a transformer 13 and through a decoupling resistor 14, provided with the usual decoupling capacitor 15. The transformer 13 should be tuned to the frequency of the incoming carrier wave by a capacitor 16 shunting the primary winding, and the secondary winding is connected to a pair of output terminals 17.

The resistor 8 is effectively shunted by a control valve 18, the anode of which is connected to the junction point of elements 7 and 8, and the cathode of which is connected to ground through a resistor 19 which may in some circumstances not be required, in which case it is replaced by a direct connection. The negative automatic gain control voltage derived from other stages of the receiver (not shown) is applied to terminal 20, which is connected to the corresponding ground terminal 21 by a potentiometer 22. The movable contact of this potentiometer is connected to the control grid of the valve 18.

The suppressor grids of the valves 1 and 18 are shown connected to the corresponding cathodes, and the screen grids are polarised through resistors 23 and 24. A bypass capacitor 25 is provided for the screen grid of valve 1. No corresponding capacitor is required for the valve 18, since this valve is not used for alternating current.

As will be explained with reference to Fig. 2, under normal conditions, with a good signal-to-noise ratio, the valve 1 passes short pulses at the tips of the positive loops of the carrier wave, and the tuned transformer 13 acts as a narrow bandpass filter to select the fundamental component of the carrier frequency, thus re-creating the carrier wave with constant amplitude.

The valve 1 actually performs simultaneously two functions. Firstly, it limits the carrier wave so that a constant output amplitude is produced, and secondly it removes the noise voltages which under normal conditions cannot overcome the cut-off bias of the valve. However, when serious fading occurs, the operation of the automatic gain control arrangements greatly increases the noise voltages, which may then be able to overcome the cut-off bias. If the latter is increased to deal with the increased noise level, then unsatisfactory limiting may result because the carrier wave voltage may not be sufficient to carry the control grid potential up to the grid current region which sets the upper limiting level. In order to get over this difficulty according to the present invention, the control valve 18 is provided, to which the gain control voltage is applied. When the received carrier wave level is normal, the negative automatic gain control voltage is relatively high, and the potentiometer 22 should be adjusted so that the valve 18 is cut off in this condition. A suitable negative cut-off bias for the valve 1 should be produced by adjustment of the potentiometer 8. If now serious fading occurs, so that the negative automatic gain control voltage decreases sufficiently to unblock the valve 18, the consequent reduction in anode voltage increases the negative cut-off bias applied to the valve 1, so that the noise voltages are more efficiently removed. As already explained, however, the increase in the cut-off bias will tend to make the limiting less complete. The basis of the invention is thus a compromise between efficient noise suppression and efficient limiting, and it is assumed that when the signal-to-noise ratio is very low, incomplete noise suppression is more harmful than incomplete limiting. The point at which the change should occur will depend upon circumstances, and the point at which the valve 18 becomes unblocked when serious fading occurs and can be adjusted by means of the potentiometer 22.

It will be noted that once the valve 18 is unblocked, the cut-off bias applied to the valve 1 progressively increases as the level of the carrier wave decreases, so that the limiting becomes less and less complete as the carrier level continues to fall.

The operation of the circuit will be explained in more detail with reference to Fig. 2, in which the control grid-cathode voltage of the valve 1 is shown plotted with respect to time.

In most valves grid current starts to flow when the grid voltage is near to zero, so the time axis 26 conveniently represents the upper limiting level of the valve. The lower limiting level represented by the line 27 is at the cut-off voltage $-v$. The wave 28 represents the carrier wave voltage and the axis 29 of the wave is depressed below the time axis by the bias voltage $-V$. It is evident that under normal conditions $-V$ should be slightly less than half the maximum amplitude of the carrier wave, so that substantially only the positive tips of the wave are passed. In this condition noise will be completely suppressed if the noise voltage does not exceed $V-v$ shown as cross hatched. Now if the received signal level falls until the noise voltage exceeds $V-v$ it is desirable that the valve 18 should become unblocked so that the bias voltage V may be increased in order to suppress the noise voltage. It will be seen that the effect of this will be to depress the line 29 so that presently the tips of the waves will not reach the upper limiting level 26 and limiting will not be complete.

As already explained, the tuned transformer 13 (Fig. 1) selects the fundamental carrier frequency from the pulses passed by the limiting valve 1, so that a regenerated carrier wave of constant amplitude is produced at terminals 16 and 17 when the signal-to-noise ratio is good. This transformer will also select a similar wave from any noise pulses which get through, though the frequency of the wave will not in general be the same as the carrier frequency, and may differ from it by a small amount depending on the sharpness of tuning of the transformer. Thus it will evidently be important to remove the noise when the signal-to-noise ratio is low. It will be clear from Fig. 2 that when the noise amplitude has become equal to or greater than the carrier wave amplitude, the carrier wave will be cut off altogether, but in this case the carrier wave could not be satisfactorily utilised.

It is possible that the automatic gain control voltage available at terminal 20 may be insufficient to cut off the valve 18 when the signal-to-noise ratio has reached the control point at which the valve should start to conduct, even when the movable contact of the potentiometer 22 is at the upper end thereof. This is the reason for the cathode resistor 19, which provides the extra bias required. In the alternative case where the automatic gain control voltage is too high, the resistor 19 can be omitted and replaced by a direct connection, and the critical point can be set by appropriate adjustment of the potentiometer 22.

While the principles of the invention have been described above in connection with specific embodiments, and particular modifications thereof, it is to be clearly understood that this description is made only by way of example and not as a limitation on the scope of the invention.

What is claimed is:

1. An amplitude limiting and noise suppressing arrangement for an electric carrier current communication receiver provided with an automatic gain control circuit comprising a limiting amplifier valve, means applying to said value the received waves after subjection to the automatic gain control circuit, means applying a cut-off bias voltage to the limiting valve, a normally blocked control valve having its output circuit coupled to the input of said limiting valve means applying the automatic gain control voltage to the control valve, means responsive to the signal to noise ratio of said received waves for unblocking said control valve when said ratio is less than a predetermined value, and means responsive to the conductive condition of said control valve for varying the bias on said limiting valve.

2. An arrangement according to claim 1 comprising a bias circuit including a direct current source supplying current to a chain of two resistors connected in series, means connecting the control grid and cathode of the limiting valve to suitable points of the bias circuit to provide a cut-off bias voltage for the valve, and means connecting the anode and cathode of the control valve to suitable points of the said bias circuit whereby unblocking of the control valve causes said cut-off bias voltage to increase.

3. An arrangement according to claim 1 in which the cathodes of the limiting and control valves are connected to the negative terminal of a high tension source and to the positive terminal of the bias source, the anode of the control valve being connected to the positive terminal of the said high tension source through a load resistor, and to the negative terminal of the bias source through a potentiometer, and the control grid of the limiting valve being connected to the movable contact of the potentiometer, the automatic gain control voltage being negative and being applied to the control grid of the control valve.

4. An arrangement according to claim 3 in which the the primary winding of a tuned output transformer is connected in series with the anode circuit of the limiting valve.

References Cited in the file of this patent

UNITED STATES PATENTS

| | | |
|---|---|---|
| 2,356,140 | Applegarth | Aug. 22, 1944 |
| 2,462,224 | Rheams | Feb. 22, 1949 |
| 2,533,803 | Hings | Dec. 12, 1950 |